United States Patent
Bisti et al.

(10) Patent No.: US 12,216,657 B2
(45) Date of Patent: Feb. 4, 2025

(54) CONTEXTUAL SEARCHES IN SOFTWARE DEVELOPMENT ENVIRONMENTS

(71) Applicant: INTERNATIONAL BUSINESS MACHINES CORPORATION, Armonk, NY (US)

(72) Inventors: Jeffrey Bisti, New Paltz, NY (US); Justin Paul Largo, Raleigh, NC (US); Colton Jarrett Cox, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/184,751

(22) Filed: Mar. 16, 2023

(65) Prior Publication Data
US 2024/0311375 A1    Sep. 19, 2024

(51) Int. Cl.
*G06F 16/2455*    (2019.01)
*G06F 8/20*    (2018.01)
*G06F 8/41*    (2018.01)

(52) U.S. Cl.
CPC ............ *G06F 16/2455* (2019.01); *G06F 8/20* (2013.01); *G06F 8/427* (2013.01)

(58) Field of Classification Search
CPC ......... G06F 16/2455; G06F 8/20; G06F 8/427
USPC ....................................................... 707/769
See application file for complete search history.

(56) References Cited

U.S. PATENT DOCUMENTS

| | | | | |
|---|---|---|---|---|
| 6,430,556 B1 * | 8/2002 | Goldberg | ............... | G06F 16/252 717/124 |
| 7,437,703 B2 * | 10/2008 | Wu | ......... | G06N 5/022 706/45 |
| 7,669,177 B2 * | 2/2010 | Gerber | ................ | G06F 9/44505 715/745 |
| 8,185,545 B2 * | 5/2012 | Reisman | ............... | G06F 16/951 707/769 |
| 8,219,516 B2 | 7/2012 | Foulger | | |

(Continued)

OTHER PUBLICATIONS

Author Unknown, "How Much Does an Experienced Programmer Use Google?", Reddit.com, [accessed Oct. 18, 2022], 26 pgs., Retrieved from the Internet <https://www.reddit.com/r/programming/comments/3bwo68/how_much_does_an_experienced_programmer_use_google/>.

(Continued)

*Primary Examiner* — Hanh B Thai
(74) *Attorney, Agent, or Firm* — Daniel J Blabolil

(57) ABSTRACT

A computer-implemented method, a computer system and a computer program product introduce context to searches within a software development environment. The method includes receiving a search query from a user in the software development environment. The method also includes obtaining activity data from the software development environment. In addition, the method includes determining a context for the search query based on the activity data. The method further includes performing a search by entering search parameters in a search engine, where the search parameters include the search query and the context. Lastly, the method includes displaying a list of search results in the software development environment, where a weight based on the context is applied to each search result and the list of search results is displayed in order of the weight.

17 Claims, 2 Drawing Sheets

(56) References Cited

U.S. PATENT DOCUMENTS

| | | | |
|---|---|---|---|
| 8,429,597 B2* | 4/2013 | Prigge | G06F 8/38 |
| | | | 717/104 |
| 8,645,905 B2 | 2/2014 | Halbedel | |
| 9,489,460 B2 | 11/2016 | Wexler | |
| 9,535,664 B1* | 1/2017 | Foster | G06F 8/427 |
| 9,779,132 B1* | 10/2017 | Bauer | G06F 16/245 |
| 10,951,602 B2 | 3/2021 | Du | |
| 11,294,665 B1* | 4/2022 | Foster | G06F 8/71 |
| 11,307,847 B1* | 4/2022 | Yim | G06F 8/33 |
| 2006/0277528 A1* | 12/2006 | Chen | G06F 11/3624 |
| | | | 717/124 |
| 2009/0187425 A1* | 7/2009 | Thompson | G06N 5/04 |
| | | | 703/11 |
| 2010/0094878 A1* | 4/2010 | Soroca | G06Q 30/0267 |
| | | | 707/812 |
| 2010/0131916 A1* | 5/2010 | Prigge | G06Q 10/06 |
| | | | 718/100 |
| 2011/0167105 A1* | 7/2011 | Ramakrishnan | G06Q 10/10 |
| | | | 709/203 |
| 2012/0095997 A1* | 4/2012 | Nice | G06F 16/332 |
| | | | 707/E17.083 |
| 2012/0124547 A1* | 5/2012 | Halbedel | G06F 16/903 |
| | | | 707/769 |
| 2012/0272207 A1* | 10/2012 | Lerner | G06F 8/30 |
| | | | 717/102 |
| 2012/0331439 A1* | 12/2012 | Zimmermann | G06F 8/77 |
| | | | 717/101 |
| 2013/0246996 A1* | 9/2013 | Duggal | G06F 8/35 |
| | | | 717/104 |
| 2015/0309772 A1* | 10/2015 | Duggal | G06F 8/10 |
| | | | 717/104 |
| 2016/0034260 A1* | 2/2016 | Ristock | G06F 8/36 |
| | | | 717/109 |
| 2016/0103662 A1* | 4/2016 | Di Balsamo | G06F 11/3072 |
| | | | 717/107 |
| 2016/0255139 A1* | 9/2016 | Rathod | H04N 1/32101 |
| | | | 709/203 |
| 2019/0050319 A1* | 2/2019 | Gondalia | G06F 11/3664 |
| 2019/0146760 A1* | 5/2019 | Duggal | G06F 8/20 |
| | | | 717/111 |
| 2019/0227774 A1* | 7/2019 | Banuelos | G06N 20/00 |
| 2019/0243625 A1* | 8/2019 | Sabne | G06F 8/4441 |
| 2020/0050431 A1* | 2/2020 | Zilouchian Moghaddam | |
| | | | G06F 8/38 |
| 2020/0097261 A1* | 3/2020 | Smith | G06F 40/174 |
| 2020/0142688 A1 | 5/2020 | He | |
| 2020/0150953 A1* | 5/2020 | Smith | G06F 8/75 |
| 2021/0124561 A1* | 4/2021 | Pezaris | G06F 8/77 |
| 2021/0303989 A1* | 9/2021 | Bird | G06F 16/95 |
| 2021/0357762 A1* | 11/2021 | Clement | G06N 3/084 |
| 2022/0107802 A1* | 4/2022 | Rao | G06F 16/907 |
| 2022/0188081 A1* | 6/2022 | Ni | G06N 3/045 |
| 2023/0394095 A1* | 12/2023 | Socher | G06F 16/9538 |
| 2024/0069907 A1* | 2/2024 | Groenewegen | G06F 8/71 |

OTHER PUBLICATIONS

Disclosed Anonymously, "Context-Aware Text Search for Program Source Code, Documentation and Libraries", IPCOM000209856D, https://ip.com/IPCOM/000209856, Aug. 17, 2011, pp. 1-5.

* cited by examiner

CONTEXTUAL SEARCHES IN SOFTWARE DEVELOPMENT ENVIRONMENTS

BACKGROUND

Embodiments relate generally to the field of contextualizing searches in software development environments, and more specifically, to introducing context to searches within a software development environment.

It may be common for software developers to use tools such as integrated development environments for producing code in an efficient manner. In the course of using these tools and to assist with daily work, it may become necessary for software developers to use search engines. Example scenarios may include encountering an unfamiliar error, or working through new syntactical structures, or determining the best-fit open-source library to use or simply requiring a template to work from. Search engines may typically take in a query and produce results without any context behind the query and the results, such as web pages or documents that may include helpful information, likewise may not understand their usefulness to the software development community.

SUMMARY

An embodiment is directed to a computer-implemented method for introducing context to searches within a software development environment. The method may include receiving a search query from a user in the software development environment. The method may also include obtaining activity data from the software development environment. In addition, the method may include determining a context for the search query based on the activity data. The method may further include performing a search by entering search parameters in a search engine, wherein the search parameters include the search query and the context. Lastly, the method may include displaying a list of search results in the software development environment, wherein a weight based on the context is applied to each search result and the list of search results is displayed in order of the weight.

In another embodiment, the method may include monitoring a user interaction with each search result in the list of search results. In this embodiment, the method may also include determining a success factor for a respective search result in the list of search results based on the user interaction and updating the weight for the respective search result based on the user interaction and the success factor.

In a further embodiment, the method may include transmitting an indication of the user interaction and the success factor to a source of the respective search result.

In yet another embodiment, the method may include identifying a programming objective in the activity data, wherein the programming objective comprises a sequence of tasks, and determining that the user is performing a task in the sequence of tasks.

In another embodiment, the determining the context for the search query may use a machine learning model that classifies user searches based on relevant activity data from a software development session.

In still another embodiment, a machine learning model that predicts a relevance of information to a software development session based on prior user searches may be used to determine the weight that is applied to the search result.

In a further embodiment, the activity data may be selected from a group consisting of: a programming language being used in the software development environment, a library called into the software development environment, a directory structure of a working file within the software development environment, and relevant terminal messages produced within the software development environment.

In addition to a computer-implemented method, additional embodiments are directed to a computer system and a computer program product for introducing context to searches within a software development environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
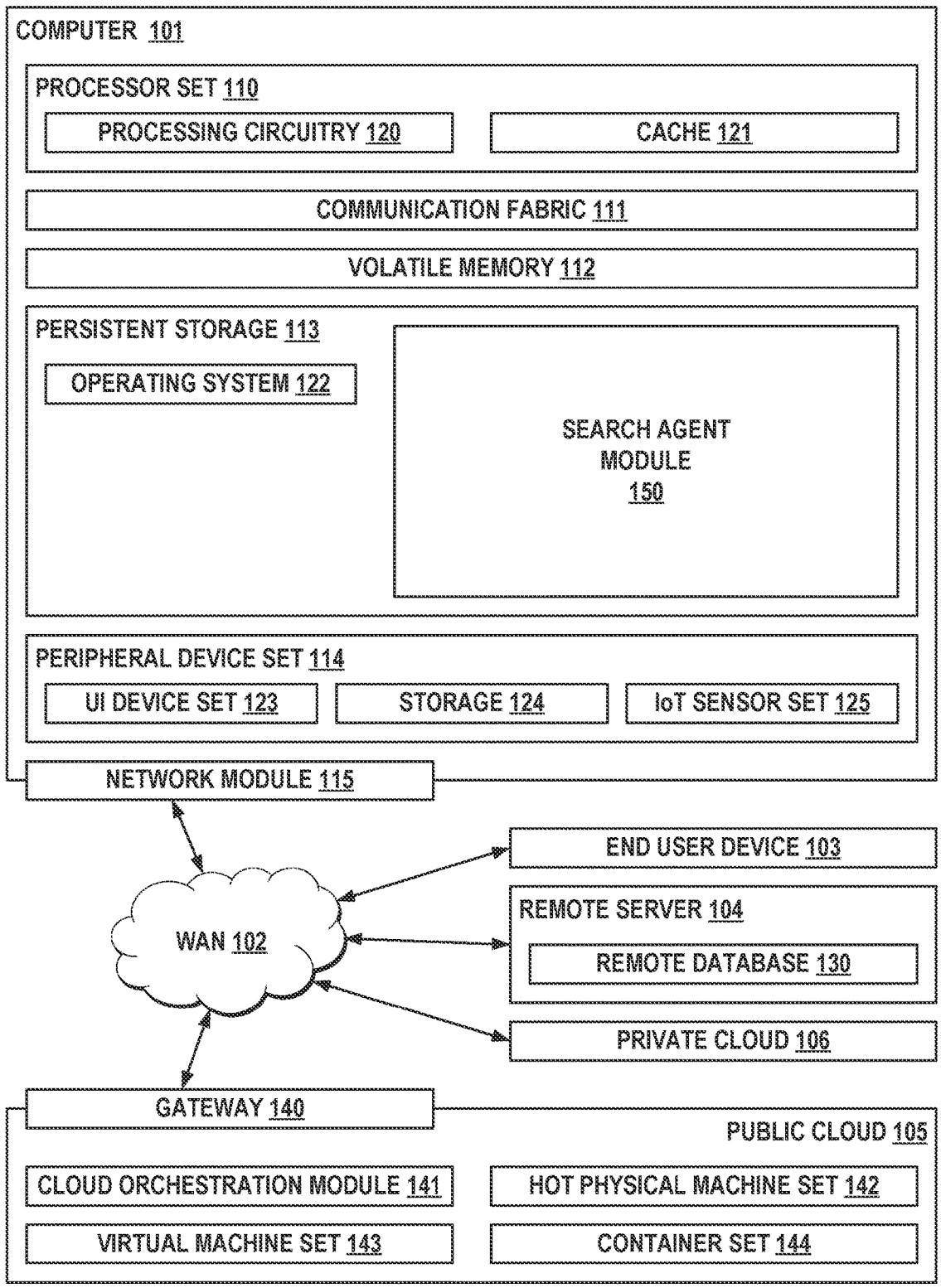
FIG. 1 depicts a block diagram of an example computer system in which various embodiments may be implemented.

In the current software development industry, it may be common for developers to use tools such as an integrated development environment (IDE), which is a software suite that may streamline the coding process by providing features that automate some aspects of programming. IDEs are designed to maximize programmer productivity by providing tight-knit components with similar user interfaces and present a single program in which all development is done. Such a program may typically provide many features for authoring, modifying, compiling, deploying and debugging software, in contrast with software development using unrelated tools. While every integrated development environment is different, there are many common features across the different types, such as a source code editor, graphical user interface, debugger, and build automation tools. Some IDEs may also include a compiler and interpreter while others may not. The boundary between an IDE and other parts of the broader software development environment is not well-defined so sometimes a version control system or various tools to simplify the construction of a graphical user interface are also integrated. Many modern IDEs also include a class browser, an object browser, and a class hierarchy diagram for use in object-oriented software development. An intended goal of such an environment is to reduce the configuration necessary to piece together multiple development utilities, instead providing the same set of capabilities as one cohesive unit. Tighter integration of development tasks may improve overall productivity beyond just helping with setup tasks. For example, code can be continuously parsed while it is being edited, providing instant feedback when syntax errors are introduced, thus allowing developers to debug code much faster and more easily with an IDE.

However, the work of developing software code may frequently require the use of search engines by a developer, for example, when encountering an unfamiliar error, or when working through new syntactical structures, or when determining the best-fit open-source library to use, or simply when requiring a template to work from. The act of moving back and forth between an integrated development environment (IDE) and a search engine can be highly disruptive, disabling the developer's overall sense of productive flow. At the same time, search engines primarily rely on the context of a user's query string, meaning that the resulting content may not be best fitted to the user's actual task and context, and as a result, developers may spend significant time researching the problems that may be encountered, and looking through multiple sources of content, rather than producing good code. Such a scenario may also be unsatisfying from the point of view of a documentation provider because current documentation analytics, including but not limited to pageviews, time on page, session duration, bounce rate, or page events, may not be able to capture the context behind a developer's actual technical experience with various documentation or the problems that may be solved in a specific moment by content that may be retrieved using the search engine.

It may therefore be useful to provide a method or system to introduce context from a software development environment into searches that may be performed by a developer. Such a method or system may gather relevant context from a developer's session within the environment and provide that information to a search engine when a developer makes a query, such that the search parameters that may be passed to the search engine include both the original query and the context. Once ranked search results are provided to the developer, such a method or system may monitor how the developer may interact with the results, such as homing in on those results that are most relevant to the developer or the problem to be solved, and then determine which search results may be successful in solving the developer's original problem through activity within the software development environment. Using the information from the interactions and success or failure of the results, the method or system may provide feedback to the source of the results that may be useful for understanding the effectiveness of the search results. Such a method or system may improve the efficiency of both search engines and integrated development environment tools by enhancing the search process and also the quality of available documentation to developers. Enhancing the tools available to software developers may in turn improve the efficiency and quality of software code that may be available in the marketplace.

Referring to FIG. 1, computing environment 100 contains an example of an environment for the execution of at least some of the computer code involved in performing the inventive methods, such as search agent module 150. In addition to search agent module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and search agent module 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in search agent module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in search agent module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to introduce context to searches within a software development environment. In particular, search agent module 150 may receive a search query from a user in the software development environment. For instance, a software developer may have a certain piece of code that repeatedly fails in testing or an error message may be displayed within the environment that the user has never seen before, and may decide to make a search for more information. The user may enter text information in a search box within a search engine that is either integrated into the development environment or a simple Internet search. Once the search agent module 150 has the query, activity data relevant to the user and the query may be obtained. Activity data may include, but is not limited to, information about a user's session in the environment such as the most recent messages produced in the user's terminal or the programming language being used or libraries that have been called into the user's program or the directory structure of the working file. Using this activity data, the search agent module 150 may determine the context of the search query, including whether the user is performing a given step of a sequence of tasks that may be predictable. Context in this scenario may include identifying a specific task that may be in progress, e.g., a developer may be trying to rewrite code that has failed an automated test. The search agent module may combine the context with search query itself as parameters to be entered into a search engine. The context may be used either to add text to the search, such as providing additional text to the search query, or may be used to weight search results that may be returned from the search engine based on the search query alone. The results from the search engine, weighted based on the context, may be displayed to the user in the software development environment in order of any weight that may have been applied based on the context. At this point, any interaction between the user and the results may be monitored, along with data about the success of an individual search result in solving any problems. This information, in addition to informing the context determination that may be made by search agent module 150, may be transmitted to the source of a search result, e.g., a documentation provider, to assist the source in understanding how content is used and whether the content is effective.

Figure 2:
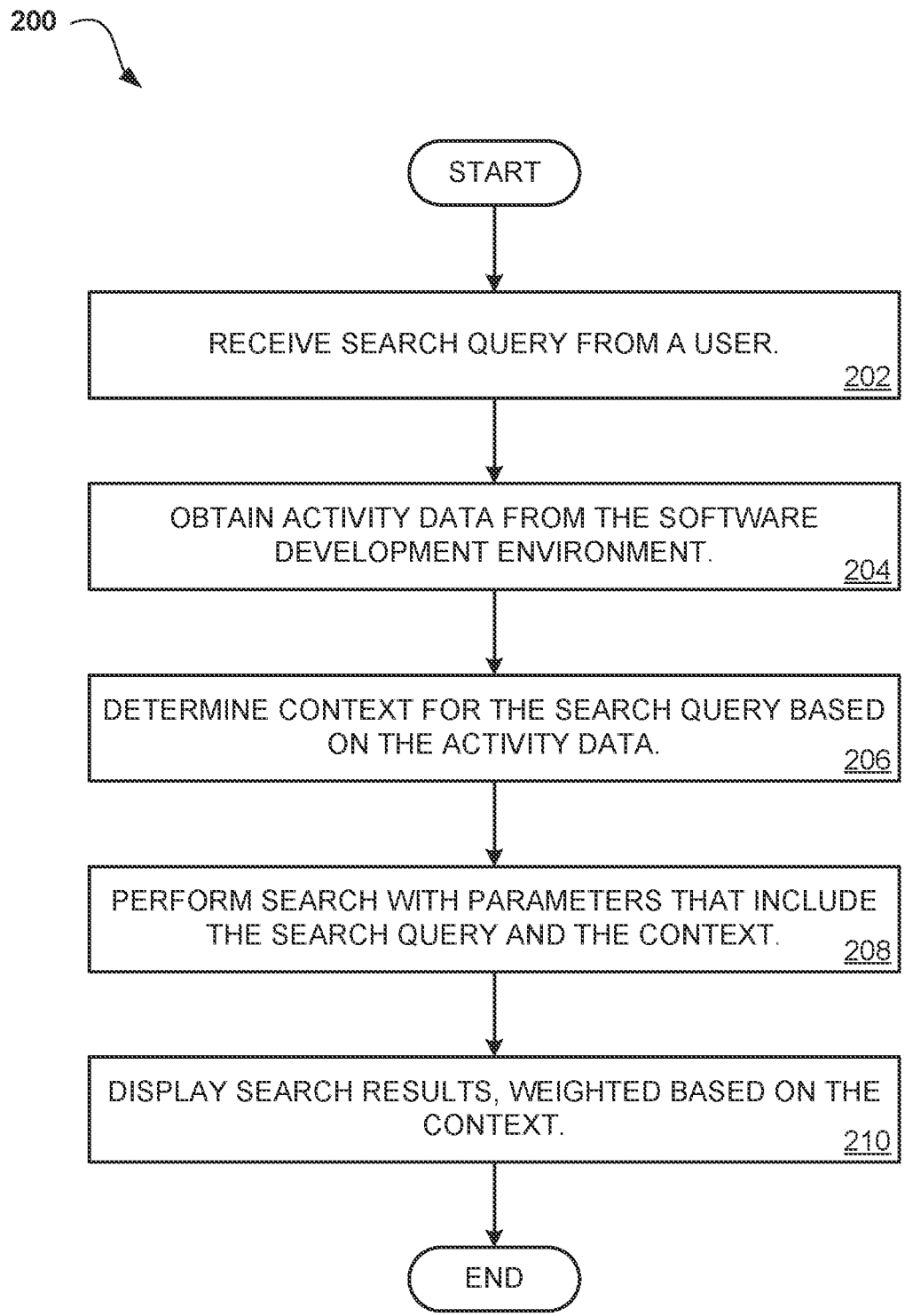
FIG. 2 depicts a flow chart diagram for a process that introduces context to searches within a software development environment according to an embodiment.

Referring to FIG. 2, an operational flowchart illustrating a process 200 that introduces context to searches within a software development environment. is depicted according to at least one embodiment. At 202, a search query may be received from a user in the environment. For instance, a developer working within a development tool may encounter a knowledge gap that impedes them from making demonstrable progress, e.g., a repeatedly failed automated test of their code or an unrecognized error code or message. In this case, the developer may provide a search query that describes the problem, such as the error message or code along with other text that may describe the situation. One of ordinary skill in the art will recognize that the search query is not required to be text entered in a search field on the screen but may be spoken by the user, in which case a microphone may capture the audio and a text-to-speech application may be used to create the text in the search box. In addition, it is not required for the user to open an internal search function within the software development environment as external search engines may also be used. While the functionality of the search agent module 150 is integrated with the functionality of the software development environment, it is not required that all software function as one application but may be installed and run as separate modules as well.

At 204, activity data that may be relevant to the search query may be obtained from the software development environment. The activity data may be retrieved from a database that is associated with the software development environment or may be directly retrieved from the environment. The activity data may be log information about a developer's session that may be one or more of a group that may include the programming language in use, a file structure, and results about various pieces of software code that may be tested and the like. However, this activity data may also include information that identifies the developer specifically, including prior searches that a user may have conducted in the development environment or similar scenarios that may have been faced by the software developer. There is no limitation on the nature or form of the activity data that may be used to determine context as described below.

It should be noted that all collection of data specific to a software developer or any video, audio or text that may personally identify the software developer or is sensitive in any other way requires the informed consent of all people whose information may be collected and analyzed. Consent may be obtained in real time or through a prior waiver or other process that informs a subject that their information may be captured by a device or other process and that the information may be used to determine context of a search query, as will be described in detail below. The information owner is free to decide at any time to revoke consent for use of sensitive information as these settings are permanently retained to keep complete control over their informed consent to use sensitive information in the process described herein. The consent described here may also refer to allowing some, or any, data relating to the information owner from being sent to a local server, cloud server or any other location. The owner has complete control on the transmission of information that may be sensitive or personally identify the owner of the information.

At 206, a context for the search query may be determined based on the activity data. As an example, natural language processing may be used to evaluate the search query, along with the syntax and logic of code that may be in progress and observable error notifications. A decision tree may be used to look across any of a multitude of contextual factors, e.g., the language used or file structure or libraries that may have been called, as described above, with the intent to sort a user's context into an appropriate category, at which time a clustering algorithm, e.g., a K-Means Nearest Neighbor algorithm, may be used to relate that user's context to similar prior searches.

In an embodiment, a supervised machine learning model may be trained to classify search queries into appropriate categories that may be used to introduce context to the search queries. The activity data and the interactions of a developer with the software development environment may allow the search query and activity data to be grouped into contexts that may be suggested by prior searches or activity by the developer. One or more of the following machine learning algorithms may be used: logistic regression, naive Bayes, support vector machines, deep neural networks, random forest, decision tree, gradient-boosted tree, multi-layer perceptron. In an embodiment, an ensemble machine learning technique may be employed that uses multiple machine learning algorithms together to assure better classification when compared with the classification of a single machine learning algorithm. In this embodiment, training data for the model may include prior search queries initiated by developers within the software development environment or any prior coding work within the environment, even if search queries had not been made, along with information about the success of the prior work. The training data may be collected from a single developer or interaction or from multiple developers or interactions over a longer period of time. The results may be stored in a database so that the data is most current, and the output would always be up to date.

It should be noted that the same or a second instance of the supervised machine learning model described above may be used to determine if the search query is likely to have sequential context, i.e., if the developer's current task may be a given task in a series of common steps. The training data for this model may be common tasks that may be known to the model through prior interactions between the environment and software developers and again, the training data may be collected from a single user's history or from multiple users over a longer period of time. In this case, the individual steps of a common objective may be enumerated into steps that may be recognized by the model and the search agent module 150 may predict the next step in the objective such that search results may be tailored to solve problems that may be common to the overall objective in addition to the specific task or step being performed within the software development environment at the time of the search query.

At 208, a search may be performed by entering search parameters that include the search query and context. To accomplish this, the search query and context may be passed to an external search engine or a module that may be integrated with the software development environment. The text of the search query may be enhanced by search agent module 150 to include additional text that may include the classification of the search query in the prior step or, in some cases, preconfigured text that may correspond to the classification. However, using preconfigured text is not required as the module 150 may use any text that may be needed to express the context for the search query to the search engine. In addition, the text may be appended to the search query, but this is not required. The only requirement is that the parameters of the search include both the user's search query and the determined context.

At 210, the returned search results may be displayed to the developer in the software development environment. The search agent module 150 may weight the search results using the determined context, where prior user searches and interactions with the software development environment may be used to predict the relevance or usefulness of each search result in the list that may be provided by the search engine. In addition, at this step a success factor may be identified for each search result, namely whether the developer used the search result, such as a manual or other documentation that may be posted in a way that is accessible to the search engine, and the resulting actions ended in a successful outcome. For example, it may be determined that the user successfully compiled their code after viewing certain documentation and this be learned and noted in the software development environment so that the certain documentation may be preferred in later user searches. Likewise, unsuccessful outcomes may result in deprioritized documentation in later searches.

By monitoring user interactions and the success factor, an activity database for the software development environment may be updated with the information and whatever source that may have been used to retrieve the search result may also be updated through a transmitted notification that may include the details of the user interaction and success factor. As a result, the source may receive contextual feedback that may be used to improve the documentation or other search results that may exist and also the activity data that may be used for subsequent searches and other activity may be more complete, resulting in a more efficient tool for software developers. It should be noted that the software development environment may or may not include an activity database as described herein. If a database exists, then the search agent module 150 may edit the database as needed to include the information described by the process 200 and if a database does not exist, then the search agent module may also create an activity database to store the information described above. It is also not required for this information to be stored in a database as the purpose of this step is to remember success or failure of actions as they apply to search results and use the information to adjust future user searches within the software development environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for identifying content relevant to a task being performed within a software development environment (SDE), the computer-implemented method comprising:
   receiving a search query from a user in the SDE;
   obtaining activity data and prior interactions of the SDE from the SDE;
   training one or more machine learning models using the activity data, the SDE's prior interactions, and tasks known to the one or more machine learning models through the SDE's prior interactions;
   integrating the one or more trained machine learning models in the SDE;
   determining a context for the received search query and whether the received search query has sequential context using the one or more trained machine learning models;
   predicting one or more steps in a programming objective in the activity data and a subsequent step in the programming objective using the one or more trained machine learning models upon determining that the received search query has sequential context;
   introducing the determined context, as well as the predicted one or more steps and the subsequent step in the programming objective, to the received search query using the one or more trained machine learning models to modify search parameters of the received search query;
   performing a search using a search engine integrated with the SDE, using the modified search parameters of the received search query; and
   displaying a list of search results in the SDE, wherein the search results are weighted using the one or more trained machine learning models based on the determined context, as well as the predicted one or more steps and the subsequent step in the programming objective.

2. The computer-implemented method of claim 1, further comprising:
   monitoring a user interaction with each search result in the list of search results;
   determining a success factor for a respective search result in the list of search results based on the user interaction; and
   updating the SDE and the search engine using contextual feedback sent to the SDE and the search engine through a transmitted notification, wherein the contextual feedback is based on the monitored user interaction and the determined success factor.

3. The computer-implemented method of claim 1, further comprising:
   identifying the programming objective in the activity data, wherein the programming objective comprises a sequence of tasks; and
   determining that the user is performing the task in the sequence of tasks.

4. The computer-implemented method of claim 1, wherein the determining the context for the received search query further comprises using the one or more trained machine learning models to classify user searches based on relevant activity data from a software development session.

5. The computer-implemented method of claim 1, wherein the weighting of the search results using the one or more trained machine learning models further comprises predicting a relevance of information to a software development session based on prior user searches.

6. The computer-implemented method of claim 1, wherein the activity data is selected from a group consisting of: a programming language being used in the software development environment, a library called into the software development environment, a directory structure of a working file within the software development environment, and relevant terminal messages produced within the software development environment.

7. A computer system for identifying content relevant to a task being performed within a software development environment (SDE), the computer system comprising:
   one or more processors, one or more computer-readable memories, and one or more computer-readable storage media;
   program instructions, stored on at least one of the one or more computer-readable storage media for execution by at least one of the one or more processors via at least one of the one or more memories, to receive a search query from a user in the SDE;
   program instructions, stored on at least one of the one or more computer-readable storage media for execution by at least one of the one or more processors via at least one of the one or more memories, to obtain activity data and prior interactions of the SDE from the SDE;
   program instructions, stored on at least one of the one or more computer-readable storage media for execution by at least one of the one or more processors via at least one of the one or more memories, to train one or more machine learning models using the activity data, the SDE's prior interactions, and tasks known to the one or more machine learning models through the SDE's prior interactions;

program instructions, stored on at least one of the one or more storage media for execution by at least one of the one or more processors via at least one of the one or more memories, to integrate the one or more trained machine learning models in the SDE;

program instructions, stored on at least one of the one or more storage media for execution by at least one of the one or more processors via at least one of the one or more memories, to determine a context for the received search query and whether the received search query has sequential context using the one or more trained machine learning models;

program instructions, stored on at least one of the one or more storage media for execution by at least one of the one or more processors via at least one of the one or more memories, to predict one or more steps in a programming objective in the activity data and a subsequent step in the programming objective using the one or more trained machine learning models upon determining that the received search query has sequential context;

program instructions, stored on at least one of the one or more storage media for execution by at least one of the one or more processors via at least one of the one or more memories, to introduce the determined context, as well as the predicted one or more steps and the subsequent step in the programming objective, to the received search query using the one or more trained machine learning models to modify search parameters of the received search query;

program instructions, stored on at least one of the one or more storage media for execution by at least one of the one or more processors via at least one of the one or more memories, to perform a search using a search engine integrated with the SDE, using the modified search parameters of the received search query; and program instructions, stored on at least one of the one or more computer-readable storage media for execution by at least one of the one or more processors via at least one of the one or more memories, to display a list of search results in the SDE, wherein the search results are weighted using the one or more trained machine learning models based on the determined context, as well as the predicted one or more steps and the subsequent step in the programming objective.

8. The computer system of claim 7, further comprising:

program instructions, stored on at least one of the one or more computer-readable storage media for execution by at least one of the one or more processors via at least one of the one or more memories, to monitor a user interaction with each search result in the list of search results;

program instructions, stored on at least one of the one or more computer-readable storage media for execution by at least one of the one or more processors via at least one of the one or more memories, to determine a success factor for a respective search result in the list of search results based on the user interaction; and program instructions, stored on at least one of the one or more computer-readable storage media for execution by at least one of the one or more processors via at least one of the one or more memories, to update the SDE and the search engine using contextual feedback sent to the SDE and the search engine through a transmitted notification, wherein the contextual feedback is based on the monitored user interaction and the determined success factor.

9. The computer system of claim 7, further comprising:

program instructions, stored on at least one of the one or more computer-readable storage media for execution by at least one of the one or more processors via at least one of the one or more memories, to identify the programming objective in the activity data, wherein the programming objective comprises a sequence of tasks; and program instructions, stored on at least one of the one or more computer-readable storage media for execution by at least one of the one or more processors via at least one of the one or more memories, to determine that the user is performing the task in the sequence of tasks.

10. The computer system of claim 7, wherein the determining the context for the received search query further comprises using the one or more trained machine learning models to classify user searches based on relevant activity data from a software development session.

11. The computer system of claim 7, wherein the weighting of the search results using the one or more trained machine learning models further comprises predicting a relevance of information to a software development session based on prior user searches.

12. The computer system of claim 7, wherein the activity data is selected from a group consisting of: a programming language being used in the software development environment, a library called into the software development environment, a directory structure of a working file within the software development environment, and relevant terminal messages produced within the software development environment.

13. A computer program product for identifying content relevant to a task being performed within a software development environment (SDE), the computer program product comprising:

one or more computer-readable storage media;

program instructions, stored on at least one of the one or more computer-readable storage media, to receive a search query from a user in the SDE;

program instructions, stored on at least one of the one or more computer-readable storage media, to obtain activity data and prior interactions of the SDE from the SDE;

program instructions, stored on at least one of the one or more computer-readable storage media, to train one or more machine learning models using the activity data, the SDE's prior interactions, and tasks known to the one or more machine learning models through the SDE's prior interactions;

program instructions, stored on at least one of the one or more computer-readable storage media, to integrate the one or more trained machine learning models in the SDE;

program instructions, stored on at least one of the one or more computer-readable storage media, to determine a context for the received search query and whether the received search query has sequential context using the one or more trained machine learning models;

program instructions, stored on at least one of the one or more computer-readable storage media, to predict one or more steps in a programming objective in the activity data and a subsequent step in the programming objective using the one or more trained machine learning models upon determining that the received search query has sequential context;

program instructions, stored on at least one of the one or more computer-readable storage media, to introduce the determined context, as well as the predicted one or more steps and the subsequent step in the programming objective, to the received search query using the one or more trained machine learning models to modify search parameters of the received search query;

program instructions, stored on at least one of the one or more computer-readable storage media, to perform a search using a search engine integrated with the SDE, using the modified search parameters of the received search query; and program instructions, stored on at least one of the one or more computer-readable storage media, to display a list of search results in the SDE, wherein the search results are weighted using the one or more trained machine learning models based on the determined context, as well as the predicted one or more steps and the subsequent step in the programming objective.

14. The computer program product of claim 13, further comprising:

program instructions, stored on at least one of the one or more computer-readable storage media, to monitor a user interaction with each search result in the list of search results;

program instructions, stored on at least one of the one or more computer-readable storage media, to determine a success factor for a respective search result in the list of search results based on the user interaction; and program instructions, stored on at least one of the one or more computer-readable storage media, to update the SDE and the search engine using contextual feedback sent to the SDE and the search engine through a transmitted notification, wherein the contextual feedback is based on the monitored user interaction and the determined success factor.

15. The computer program product of claim 13, further comprising:

program instructions, stored on at least one of the one or more computer-readable storage media, to identify the programming objective in the activity data, wherein the programming objective comprises a sequence of tasks; and program instructions, stored on at least one of the one or more computer-readable storage media, to determine that the user is performing the task in the sequence of tasks.

16. The computer program product of claim 13, wherein the determining the context for the received search query further comprises using the one or more trained machine learning models to classify user searches based on relevant activity data from a software development session.

17. The computer program product of claim 13, wherein the weighting of the search results using the one or more trained machine learning models further comprises predicting a relevance of information to a software development session based on prior user searches.

* * * * *